United States Patent [19]
Bleeker et al.

[11] Patent Number: 4,632,306
[45] Date of Patent: Dec. 30, 1986

[54] HEATER, IN PARTICULAR AN AUXILIARY HEATER FOR VEHICLES

[75] Inventors: Jochen Bleeker, Gauting; Johann Sondermeier, Krailling, both of Fed. Rep. of Germany

[73] Assignee: Webasto-Werk W. Baier GmbH & Co., Fed. Rep. of Germany

[21] Appl. No.: 697,621

[22] Filed: Feb. 4, 1985

[30] Foreign Application Priority Data

Feb. 4, 1984 [DE] Fed. Rep. of Germany ....... 3403916

[51] Int. Cl.$^4$ .............................................. B60H 1/02
[52] U.S. Cl. ................................. 237/12.3 C; 431/114; 138/42
[58] Field of Search ............... 431/127, 354, 212, 114, 431/12, 1, 69; 237/12.3 C; 417/300; 138/4 D, 42, 44, 46, 45

[56] References Cited

U.S. PATENT DOCUMENTS 3,516,807 6/1970 West et al. ........................... 431/212
4,255,125 3/1981 Auclair et al. ....................... 431/354
4,490,105 12/1984 Hunsberger ........................... 431/65

FOREIGN PATENT DOCUMENTS 389199 1/1924 Fed. Rep. of Germany ...... 431/114
551613 1/1932 Fed. Rep. of Germany ...... 431/114
1241552 6/1967 Fed. Rep. of Germany ...... 431/114

Primary Examiner—Henry Bennett
Attorney, Agent, or Firm—Sixbey, Friedman & Leedom

[57] ABSTRACT

A heater with a burner which is supplied with liquid fuel by a metering pump and a fuel supply line, is provided with a throttle in the fuel supply line between the metering pump and the burner. The throttle is preferably formed by a long throttle element, in particular a wire, which is placed and inserted into a fuel line connector that is rigidly connected to the burner. The throttle which is formed in this way smooths out the volume flow of fuel to the burner and reduces the dwell time of the fuel, especially in the fuel line connector, in order to prevent gas evolution and the associated formation of vapor bubbles.

12 Claims, 2 Drawing Figures

HEATER, IN PARTICULAR AN AUXILIARY HEATER FOR VEHICLES

BACKGROUND AND SUMMARY OF THE INVENTION

The invention pertains to a heater, in particular an auxiliary heater for motor vehicles, with a burner which is located in a combustion chamber and which can be supplied with liquid fuel via a metering pump and a fuel supply line.

Heaters of the type described above, which are used as, for example, auxiliary heaters or built-in heaters in motor vehicles, are known per se. These heaters can use air or water as a heater transfer medium. Such heaters can be operated with oil, such as diesel oil, or fuel oil or motor fuel, as a fuel. There are also different types of burners, such as vaporizing burners, atomizing burners, etc.

When an air heater is installed, the fuel line between the supply unit and the heater shoulder be designed to have an inner diameter of no more than 3 mm. In order to do this, a displacement hose can be inserted into the available fuel hose over its entire length so that the clear cross-section of the fuel hose is reduced by the displacement hose for the purpose of removing bubbles of vaporized fuel from the line.

From German Auslegeschrift Pat. No. 12 41 552 a device is known for burning liquid fuel with an atomizer nozzle or vaporizor for liquid fuel that is located in the combustion chamber; this device has an adjustment unit for setting the amount of oil in the form of a handwheel which pushes a needle into the inner section of the atomizer nozzle. Such burner elements, which are referred to as injector needles and serve to regulate the supply of fuel and adjust its size, are known from, for example, German Pat. Nos. 389 199 and 551 613. The function of these needle-like elements is to ensure appropriate regulation of the amount of fuel leaving the nozzle opening by narrowing or expanding the fuel passage cross-section in front of the nozzle outlet opening.

In the heaters of the type mentioned above, it has been found that poor combustion values, with a high proportion of CO in the exhaust gas, are obtained with these heaters in the combustion mode, especially when they operate with gasoline as a fuel. In addition, erratic combustion is observed in the combustion chamber of the heater. These difficulties proved to be particularly serious when the heater had a burner which has supplied with liquid fuel via a metering pump, such as a metering reciprocating pump, and a fuel line.

The goal of the invention is, therefore, to overcome the above-mentioned problems and to refine the design of a heater of the above-mentioned type in such a way that the burner ensures even and smooth combustion in the combustion chamber and favorable combustion values are obtained with a low proportion of CO in the exhaust gas during burning.

The invention overcomes these difficulties with a heater which has a throttle in the fuel supply line between the metering pump and the burner.

Suprisingly enough, it has been found that, by providing a throttle in the fuel supply line between the metering pump and the burner in a heater of the above-mentioned type, a very simple measure makes it possible to smooth out the volume flow of fuel to the burner, and that smooth combustion in the combustion chamber and, therefore, favorable combustion values in the heater's burn mode are obtained. The throttle in the fuel supply line cushions the surging of the fuel caused by the pulsating flow of fuel being delivered. This is made possible due to the fact that the oscillatory system in the fuel supply line, with a fuel column in the line between the metering pump and the burner, is effectively damped because a narrow gap is left open between the throttle element and the inside of the fuel supply line and, when filled with fuel, this gap acts as a viscosity damper. The throttle, thus, makes it possible to decouple the oscillatory system with the oscillating fuel column. At the same time the throttle also ensures that vapor bubble formation in the fuel supply line, due to heat from the burner causing gas evolution of the fuel in the fuel supply line, is effectively suppressed; this type of vapor bubble formation can lead to additional malfunctions in the combustion mode. In particular, the throttle reduces the passage cross-section for the fuel in the fuel supply line so that the fuel is delivered to the burner more quickly and its dwell time in the fuel supply line is thus reduced. Because of the short dwell time of the fuel in the fuel supply line, gas evolution of the fuel is largely precluded. Such gas evolution is critical, especially in heaters run on gasoline since gasoline has a lower boiling point than oil. Such vapor bubble formation in the fuel supply line would also tend to amplify the oscillations of the oscillating fuel column.

The fuel supply line throttle provided in the heater of the invention, thus, performs a dual function, namely, the damping of the fuel volume flow between the metering pump and the burner and, at the same time, reduction or prevention of vapor bubble formation in the fuel supply line.

In accordance with preferred embodiments, the throttle is relatively long, i.e., the throttle elements spans a substantial extent of the fuel supply line connector. This long throttle element is preferably a wire which is mounted in the fuel line connector and which is securely connected to the burner as a permanent part of the fuel supply line. This very simple implementation of the throttle element makes it possible, surprisingly enough, to overcome all of the problems which have arisen to date with respect to fuel supply.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
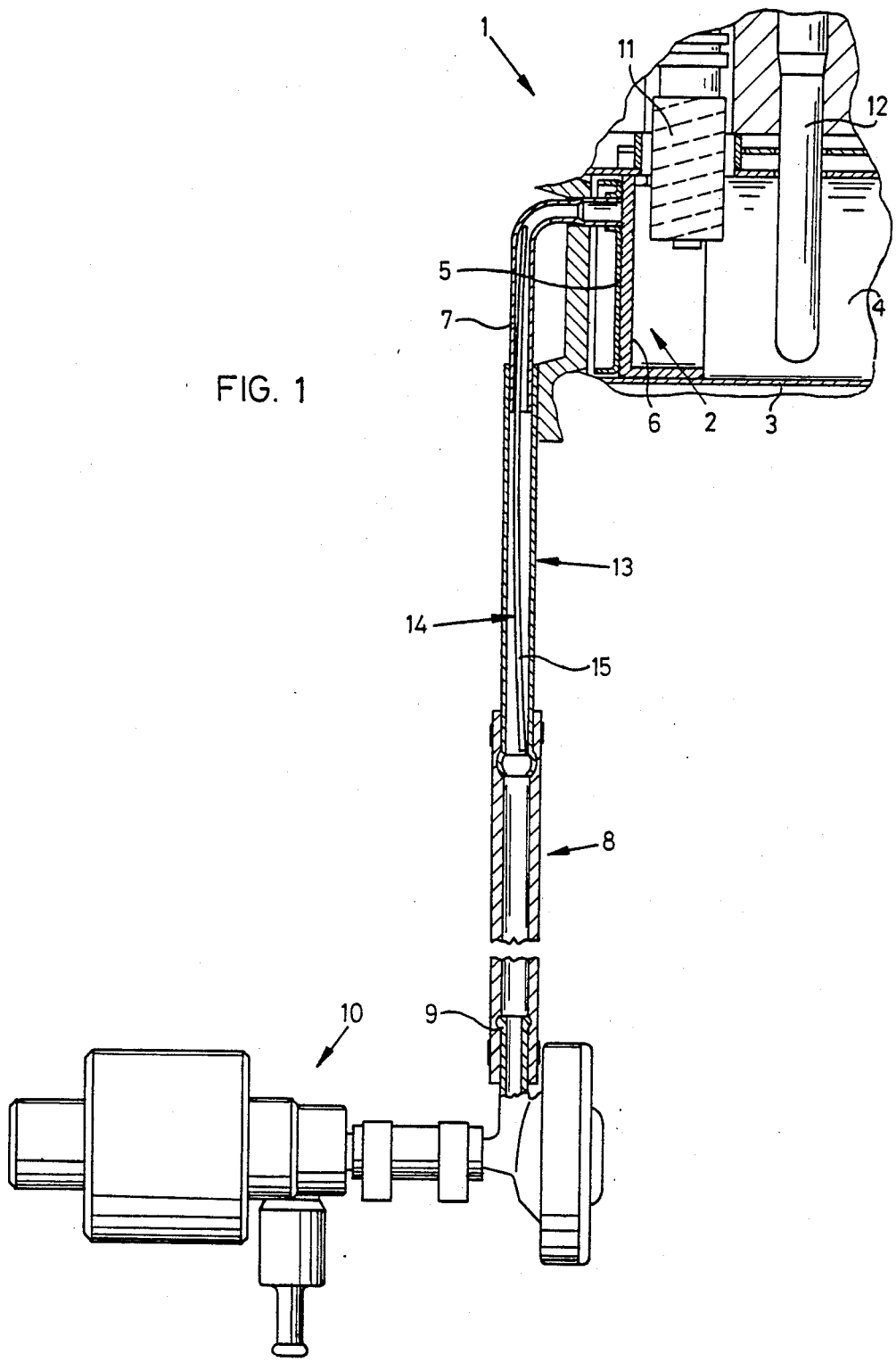
FIG. 1 shows a sectional view of a portion of a heater with a burner having an attached fuel supply line and a metering pump as a fuel delivery pump.

In FIG. 1, only the portion of a heater, which is designated generally by numeral 1, in the area around a burner 2 is shown. Burner 2 protrudes into a combustion chamber 4 which is formed by a combustion tube 3. As FIG. 2, especially, shows with particular clarity, burner 2 is designed as a vaporizing burner which has a support 5 that carries an absorbent body 6. To the back of support 5, a fuel line connector 7 is securely attached to form a part of the fuel supply line, designated generally by the numeral 8, that, as FIG. 1 indicates, is connected to an output side 9 of a metering pump 10; this pump should preferably be designed as a metering pump of the reciprocating type. FIG. 1 also shows a schematic representation of a glow plug 11, that serves as a glow device for igniting the combustible fuel mixture, as well as a combustion monitor 12. Glow plug 11 and combustion monitor 12 are axially spaced apart from one another and from burner 2 within combustion chamber 4. Combustion air is supplied to the burner 2 to form a combustible mixture in a conventional manner via a device which is not shown.

Figure 2:
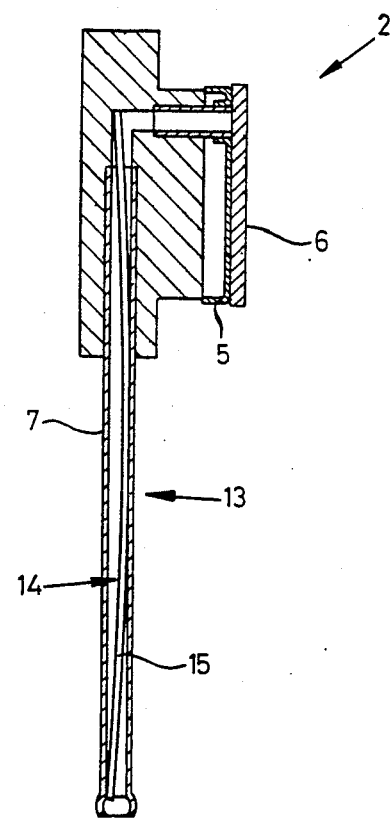
FIG. 2 shows a detailed view of a portion of a modified burner arrangement with a fuel connection attached to it.

A throttle 13 is provided in fuel supply line 8, preferably in fuel line connector 7, and has a long throttle element 15 in the form of a wire. In the case of the practical embodiment shown here, which FIG. 2 presents in particular, the wire throttle element 15 extends over the entire length of the straight part 7a of fuel line connector 7. In this regard, it is noted that the difference between FIGS. 1 and 2 lies in the fact that, in FIG. 1, fuel line connector 7 comprises a straight part 7a and an elbow bend part 7b, while in FIG. 2, the elbow bend part 7b has been replaced by an equivalent passage 7c, within combustion chamber end wall member 14, and a short support connector piece 7d.

Throttle 13, formed in this way, damps the pulsation of the fuel column in fuel supply line 8 within fuel connection 7 in such a way that an approximately continuous and uniform volume flow of fuel to burner 2 is obtained. The narrow annulus which is left open between long throttle element 15, in the form of a wire, also has the effect that the fuel moves to burner 2 via fuel supply line 8 and fuel line connector 7 faster. Thus, the fuel has a short dwell time in fuel supply line 8 and fuel line connector 7 so that the dangers of gas evolving from the fuel due to heating, especially close to burner 2, and the resulting formation of vapor bubbles, are suppressed. Throttle element 15 decouples the pulsations of the fuel column in the fuel supply line 8 caused by the metering pump as the fuel travels to burner 2 since the narrow annulus in the area of fuel line connector 7 formed by the throttle acts as a viscosity damper.

Therefore, the throttle in fuel line connector 7 of fuel supply line 8 ensures an even volume flow to burner 2 so that, in the combustion mode, the burner will allow smooth combustion in combustion chamber 4, and this ensures favorable combustion values with a low CO content in the exhaust gas.

The view of burner 2 with the attached fuel line connector 7 in FIG. 2 shows the long throttle element 15 which is designed as a wire wherein a wire diameter of, for instance, 1.6 mm and a length of 90 mm is located in a fuel line connector 7, that is formed by a tube with an outer tube diameter of, for instance, 5 mm and a wall thickness of 7.5 mm. This is to illustrate the reduction in the clear passage cross-section for the fuel in fuel connection 7; this reduction is formed by throttle 13 which ensures damping of the pulsations of the fuel flow and the shortening of the time that the fuel dwells in fuel line connector 7. However, it is noted that the dimensions may vary from one kind of heating device to another as the fuel flow requirements vary; but, as a general rule, the higher the flow of fuel through the supply line, the lesser the flow resistance and the lesser the length required for the restriction provided by the throttle.

It is also noted that even though an essentially straight or slight bowed wire has been shown as throttle element 15, such is only preferred from a cost standpoint and any shape wire may be used so long as it does not adversely affect the flow of fuel, such as by producing a whirling thereof.

Likewise, the best mode to fix the wire throttle element 15 is a snug fit insertion thereof into the fuel line connector 7 by deforming or bending an end of the wire. It is also possible to fix the wire in the line in any convenient manner that leaves sufficient space for the fuel flow and avoids any whirling of the fuel by the fixing means.

While I have shown and described various embodiments in accordance with the present invention, it is understood that the same is not limited thereto, but is susceptible of numerous changes and modifications as known to those skilled in the art, and I, therefore, do not wish to be limited to the details shown and described herein, but intend to cover all such changes and modifications as are encompassed by the scope of the appended claims.

We claim:

1. A heater, in particular an auxiliary heater for motor vehicles, with a burner which is located in a combustion chamber to which liquid fuel is supplied by a metering pump and a fuel supply line, wherein a throttle is provided in the fuel supply line between the metering pump and the burner as a means for damping of the fuel volume flow between the metering pump and the burner and, at the same time, minimizing vapor bubble formation in the supply line wherein the throttle is an elongated throttle element.

2. Heater of claim 1, wherein the elongated throttle element is a wire.

3. Heater of claim 1, wherein the throttle is located in a fuel line connector which is attached to the burner.

4. Heater of claim 3, wherein the throttle element is of substantially the same length as a straight portion of the fuel line connector between the metering pump and the burner.

5. Heater of claim 2, wherein the throttle comprises a wire element disposed within the fuel line connector.

6. Heater of claim 5, wherein the burner is a vaporizing burner.

7. Heater of claim 6, wherein the metering pump is a reciprocating pump.

8. Heater of claim 2, wherein the metering pump is a reciprocating pump.

9. Heater of claim 8, wherein the burner is a vaporizing burner.

10. Heater of claim 1, wherein the burner is a vaporizing burner.

11. Heater of claim 1, wherein the burner is a vaporizing burner.

12. Heater of claim 2, wherein the burner is a vaporizing burner.

* * * * *